United States Patent
Fukumoto

[11] Patent Number: 5,619,379
[45] Date of Patent: Apr. 8, 1997

[54] ASPHERICAL SURFACE OCULAR LENS

[75] Inventor: Satoshi Fukumoto, Machida, Japan

[73] Assignee: Nikon Corporation, Tokyo, Japan

[21] Appl. No.: 490,991

[22] Filed: Jun. 15, 1995

[30] Foreign Application Priority Data

Sep. 7, 1994 [JP] Japan .................... 6-239367

[51] Int. Cl.[6] .............. G02B 25/00; G02B 3/02
[52] U.S. Cl. ............ 359/644; 359/645; 359/646; 359/716; 359/717
[58] Field of Search ............ 359/644, 645, 359/646, 716, 717

[56] References Cited

U.S. PATENT DOCUMENTS 3,233,513  2/1966  Wagner et al. ............ 359/644
5,202,795  4/1993  Kashima .................... 359/645

FOREIGN PATENT DOCUMENTS 5-215974  8/1993  Japan .
  767827  2/1957  United Kingdom .......... 359/645

*Primary Examiner*—Georgia Y. Epps
*Assistant Examiner*—Evelyn A. Lester
*Attorney, Agent, or Firm*—Shapiro and Shapiro

[57] ABSTRACT

An ocular lens includes, sequentially from an object side, a first lens unit G1 exhibiting a negative refracting power on the whole and a second lens unit G2 exhibiting a positive refracting power on the whole. An object-side focal surface of the second lens unit G2 is positioned between the first and second lens units G1, G2. At least one lens surface of the first lens unit G1 is formed in an aspherical shape.

4 Claims, 2 Drawing Sheets

ASPHERICAL SURFACE OCULAR LENS

BACKGROUND OF THE INVENTION

1. Field of the Invention

The present invention relates generally to an aspherical surface ocular lens and, more particularly, to an ocular lens employed for, e.g., a microscope and a telescope such as a binocular telescope.

2. Related Background Art

For example, in a telescope such as a binocular telescope and a microscope, an ocular lens is used for further magnifying and observing a real image formed by an objective lens. Such an ocular lens is required to sufficiently correct a variety of aberrations through a wide field of view and, in addition, to secure an eye relief (on-axis spacing between the closest-to-eye-point surface of the ocular lens and an eye point) having a sufficient length to provide excellent optical performance over a wide field of view.

Generally, an optical system of the ocular lens or the like has such a characteristic that a Petzval's sum becomes larger with a shorter focal length, and, therefore, the various aberrations such as a curvature of field are further deteriorated at the shorter focal length.

Moreover, in the typical ocular lens, only an eye relief on the order of 80% of the focal length of the whole lens system can be obtained. Accordingly, the ocular lens having a short focal length is incapable of obtaining an eye relief having a sufficient length.

As described above, the conventional ocular lens is deteriorates in terms of the various aberrations and is therefore incapable of obtaining the eye relief having a sufficient length as the focal length is decreased. Under such circumstances, a better correction of the various aberrations entails an increased number of constructive lens elements, but this results in a disadvantage of increasing the costs.

SUMMARY OF THE INVENTION

It is a primary object of the present invention, which was devised in view of the above problems, to provide an ocular lens capable of securing a sufficient field of view and eye relief and sufficiently correcting various aberrations through a wide field of view with a small number of constructive lens elements.

To accomplish the above object, according to one aspect of the present invention, an ocular lens comprises, sequentially from an object side, a first lens unit G1 exhibiting a negative refracting power on the whole and a second lens unit G2 exhibiting a positive refracting power on the whole. An object-side focal plane of the second lens unit G2 is positioned between the first lens unit G1 and the second lens unit G2. At least one lens surface of the first lens unit G1 is formed in an aspherical shape.

According to a preferred mode of the present invention, the ocular lens satisfies the following conditions:

$$-60 < f1/f < -1.12$$

$$0.45 < D/f < 1.7$$

where f1 is the focal length of the first lens unit G1, f is the focal length of the whole lens system, and D is the on-axis air spacing between the first lens unit G1 and the second lens unit G2.

The ocular lens according to this invention includes, sequentially from the object side, the first lens unit G1 exhibiting negative refracting power on the whole and the second lens unit G2 exhibiting positive refracting power on the whole. The object-side focal plane of the second lens unit G2 is positioned between the first lens unit G1 and the second lens unit G2. At least one lens surface of the first lens unit G1 is formed in the aspherical shape.

Based on the above layout, the first lens unit G1 serves to form an image through an objective lens in the vicinity of the second lens unit G2 by diverging action thereof and also elongate the eye relief by making a pupil position approach the second lens unit G2.

Thus, a pupil image forming position through the second lens unit G2, i.e., a position of the eye point, can be made far off at a predetermined distance from the closest-to-eye-point surface of the second lens unit G2. That is, the eye relief can be increased.

Further, the first lens unit G1 exhibits negative refracting power on the whole, and, hence, the Petzval's sum can be reduced. As a result, a curvature of field is restrained, resulting in an improvement in terms of flatness of the image.

Moreover, at least one lens surface of the first lens unit G1 is formed in the aspherical shape, and the various aberrations can be thereby sufficiently corrected through the wide field of view with the small number of lens elements.

Conditional formulas of the present invention will hereinafter be described.

The aspherical surface ocular lens according to this invention preferably satisfies the following conditional formulas (1) and (2):

$$-60 < f1/f < -1.12 \qquad (1)$$

$$0.45 < D/f < 1.7 \qquad (2)$$

where f: the focal length of the whole lens system, f1: the focal length of the first lens unit G1, and D: the on-axis spacing between the first and second lens units G1 and G2.

The conditional formula (1) is intended to define a proper range of a ratio of the focal length f1 of the first lens unit G1 to the focal length f of the whole lens system.

If the lens system provides a value over an upper limit value of the conditional formula (1), the negative refracting power of the first lens unit G1 becomes too strong, and consequently the aberration caused in the first lens unit G1 increases. This makes it difficult to correct this aberration by the second lens unit G2. Further, the beam of light is made too far off the optical axis due to excessive diverging action of the first lens unit G1. This brings about an increase in lens diameter of the second lens unit G2, and the various aberrations are deteriorated due to a passage of the marginal ray through the most peripheral edge of the second lens unit G2.

Whereas if the lens system provides a value under a lower limit value of the conditional formula (1), the negative refracting power of the first lens unit G1 becomes too weak, and undesirably the eye relief is shortened.

Note that the upper limit value of the conditional formula (1) is set to −1.57, while the lower limit value thereof is set to −7.4. More preferably, the upper limit value is set to −1.8, while the lower limit value is set to −4.5. The various aberrations can be corrected in a better-balanced state, and a longer eye relief can be secured.

The conditional formula (2) is intended to define a proper range of a ratio of an on-axis spacing D between the first and second lens units G1, G2 to the focal length f of the whole lens system.

If the lens system provides a value over an upper limit value of the conditional formula (2), this induces an increase in the lens diameter of the second lens unit G2 due to the diverging action of the first lens unit G1. Further, when the binocular telescope involves the use of the ocular lens of the present invention, an erect prism is disposed on the optical path, and, if the on-axis spacing D increases, the prism therefore interferes with the first lens unit G1.

Whereas if the lens system provides a value under a lower limit value of the conditional formula (2), the spacing between the first and second lens units G1, G2 is reduced, and the image surface excessively approaches the closest-to-eye-point surface of the first lens unit G1 and the closest-to-object surface of the second lens unit G2 as well. This results in such a disadvantage that dusts and flaws on the lens surface proximal to the image surface are seen on the occasion of the observation.

Furthermore, the on-axis spacing D is gradually decreased while keeping the focal length f1 of the first lens unit G1 to a fixed value, and, at this time, the focal length f2 of the second lens unit G2 changes in a decreasing direction. The decrease in the focal length f2 of the second lens unit G2, however, implies an increase in the Petzval's sum, and this undesirably exerts an adverse influence on the flatness of the image surface.

In addition, when the focal length f2 of the second lens unit G2 is reduced, the sufficient eye relief is hard to obtain.

Given next is a comparison in a position of an eye-point-side principal point of the first lens unit G1 between a case of a meniscus configuration in which the first lens unit G1 directs its convex surface toward the eye point side and a case of a meniscus configuration in which the first lens unit G1 directs its concave surface toward the eye point side in terms of relationship between f1, f2 and D.

Generally, in the meniscus lens exhibiting the negative refracting power, the eye-point-side principal point is positioned in s direction of the center of the radius of curvature of the surface on the emerging light beam side (eye point side). Now, supposing that the on-axis air spacing D between the first end second lens units G1, G2 is the same with respect to the meniscus lens with its convex surface toward the eye point side and the meniscus lens with its concave surface toward the eye point side, the eye-point-side principal point of the first lens unit G1 is, it can he known, positioned remoter from the closest-to-object surface of the second lens unit G2 in the meniscus lens with its convex surface toward the eye point side than in the meniscus lens with its concave surface toward the eye point side.

As explained above, the first lens unit G1 takes the meniscus configuration with its convex surface toward the eye point side rather than the meniscus configuration with its concave surface toward the eye point side but is, it can be known, advantageous in terms of securing a large eye relief.

Note that it is possible to further enhance the effect by setting the upper limit value of the conditional formula (2) to 1.5 and the lower limit value to 0.67 and, more preferably, setting the upper limit value to 1.3 and the lower limit value to 0.78.

For correcting the various aberrations in a still better-balanced state, in addition to the above conditions, both of the closest-to-object surface (first surface) and the closest-to-eye-point side surface (second surface) of the first lens unit G1 are formed in the aspherical shape, and it is desirable that the following conditional formula (3) be satisfied:

$$1 < |dx_1/dy|/|dx_2/dy| \quad (3)$$

where $x_1$: the quantity of displacement in the optical-axis direction with the vertex serving as an origin on the first aspherical surface, $x_2$: the quantity of displacement in the optical-axis direction with the vertex serving as an origin on the second aspherical surface, and y: the distance from the optical axis on each aspherical surface.

However, in the conditional formula (3), there is established this relationship: $0 < y < f/2.5$. Then, the linear differential coefficient (dx/dy) represents an inclination of a tangential line with respect to the direction perpendicular to the optical axis at each point on the aspherical surface.

The conditional formula (3) prescribes a configuration of each aspherical surface of the first lens unit G1.

The various aberrations can be corrected in the well-balanced state owing to the configuration of the aspherical surface which satisfies the conditional formula (3).

Further, the negative refracting power can be imparted up to the marginal portion of the first lens unit G1 owing to the configuration of the aspherical surface which satisfies the conditional formula (3), and hence this is advantageous in terms of securing the large eye relief.

The above-mentioned various conditions are set in consideration mainly of a case where the focal length f of the whole ocular lens system is not so large, e.g., approximately 15 mm or smaller. In the case of such an ocular lens that the focal length f is larger than approximately 15 mm to some extent, the focal length f1 of the first lens unit G1, the focal length f2 of the second lens unit G2 and the on-axis spacing D are inevitably large. As a result, the requirements for correcting the aberrations and securing the eye relief can be comparatively easily met. In this case, the first lens unit G1 may take a configuration of the biconcave lens or the meniscus configuration with its concave surface toward the eye point side. In any case, however, each aspherical surface has to take such a configuration that the radius of curvature at each point increases toward the peripheral edge.

As explained above, the variety of conditions described above are the best for satisfying the many requirements (eye relief, correction of the aberrations, etc.) for the ocular lens.

The above and other objects, features and advantages of the present invention are explained hereinafter and may be better understood by reference to the drawings and the descriptive matter which follows.

DETAILED DESCRIPTION OF THE PREFERRED EMBODIMENTS

An aspherical surface ocular lens according to the present invention is, in each embodiment, constructed of, sequentially from an object side, a first lens unit G1 exhibiting a negative refracting power on the whole and a second lens unit G2 exhibiting a positive refracting power on the whole. An object-side focal plane of the second lens unit G2 is positioned between the first lens unit G1 and the second lens unit G2, and at least one lens surface of the first lens unit G1 is formed as an aspherical surface.

Each of the embodiments of the present invention will hereinafter be discussed with reference to the accompanying drawings.

Embodiment 1

Figure 1:
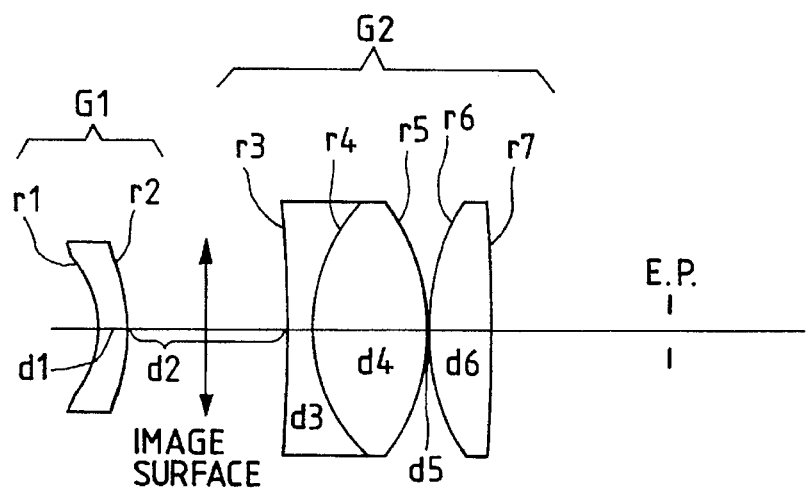
FIG. 1 is a view illustrating a layout of an aspherical surface ocular lens in accordance with a first embodiment of the present invention.

FIG. 1 is a view illustrating a lens layout of an aspherical surface ocular lens in accordance with a first embodiment of the present invention.

The illustrated aspherical surface ocular lens is constructed of, sequentially from the object side, a first lens unit G1 composed of a negative meniscus aspherical lens with its convex surface toward an eye-point-side and a second lens unit G2 composed of a cemented positive lens of a biconcave lens and a biconvex lens and also a biconvex lens.

Note that E.P. designates an eye point in FIG. 1.

Table 1 shows values of data in the embodiment 1. In Table 1, f is the focal length, and $2\omega$ is the field of view. Further, the numeral at the left end represents the order of each lens surface from the object side, r is the radius of curvature of each lens surface, d is the spacing between the respective lens surfaces, and n and v are the refractive index and the Abbe number, respectively with respect to d-line ($\lambda$=587.6 nm).

Also, in each embodiment, the aspherical surface is expressed by the following formula (a).

$$x = (y^2/r)/[1+(1-k \cdot y^2/r^2)^{1/2}] + C_2 \cdot y^2 + C_4 \cdot y^4 + C_6 \cdot y^6 + C_8 \cdot y^8 + C_{10} \cdot y^{10} + \ldots \quad (a)$$

where y is the height in the direction perpendicular to the optical axis, x is the quantity of displacement in the optical-axis direction at the height y, r is the fiducial radius of curvature, i.e., the radius of vertex curvature of the aspherical surface, k is the conical coefficient, and Cn is the nth-order aspherical surface coefficient.

Further, the paraxial curvature radius R of the aspherical surface is defined by the following formula (b).

$$R = 1/(2 \cdot C_2 + 1/r) \quad (b)$$

The right side of the surface number of the aspherical surface is marked with an asterisk [*] in each Table.

TABLE 1 f = 10.0
$2\omega = 50°$
Eye relief 13.1

| | r | d | n | v |
|---|---|---|---|---|
| 1* | −7.875 | 2.0 | 1.4911 | 57.6 |
| 2* | −18.060 | 11.67 | | |
| 3 | −247.500 | 2.0 | 1.7847 | 25.8 |
| 4 | 11.880 | 8.0 | 1.6204 | 60.1 |
| 5 | −14.720 | 0.2 | | |
| 6 | 14.370 | 4.5 | 1.6204 | 60.1 |
| 7 | −183.970 | | | |

TABLE 1-continued (Aspherical Surface Data)

| | k | $C_2$ | $C_4$ |
|---|---|---|---|
| 1st Surface | 1.8270 | 0.0000 | $-0.27520 \times 10^{-3}$ |
| | $C_6$ | $C_8$ | $C_{10}$ |
| | $0.10460 \times 10^{-4}$ | $0.16040 \times 10^{-5}$ | $-0.13490 \times 10^{-7}$ |

(Aspherical Surface Data

| | k | $C_2$ | $C_4$ |
|---|---|---|---|
| 2nd Surface | 0.0000 | 0.0000 | $-0.11460 \times 10^{-2}$ |
| | $C_6$ | $C_8$ | $C_{10}$ |
| | $0.19260 \times 10^{-4}$ | $-0.49560 \times 10^{-8}$ | $0.73840 \times 10^{-8}$ |

(Condition Corresponding Values)

f1 = −30.4
f2 = 12.75
D = 11.67
(1) f1/f = −3.04
(2) D/f = 1.167
(3) $|dx_1/dy|/|dx_2/dy| = 2.1715$ (y = 1)
  $|dx_1/dy|/|dx_2/dy| = 1.9186$ (y = 2)
  $|dx_1/dy|/|dx_2/dy| = 1.6647$ (y = 3)
  $|dx_1/dy|/|dx_2/dy| = 1.4029$ (y = 4)

Figure 2:
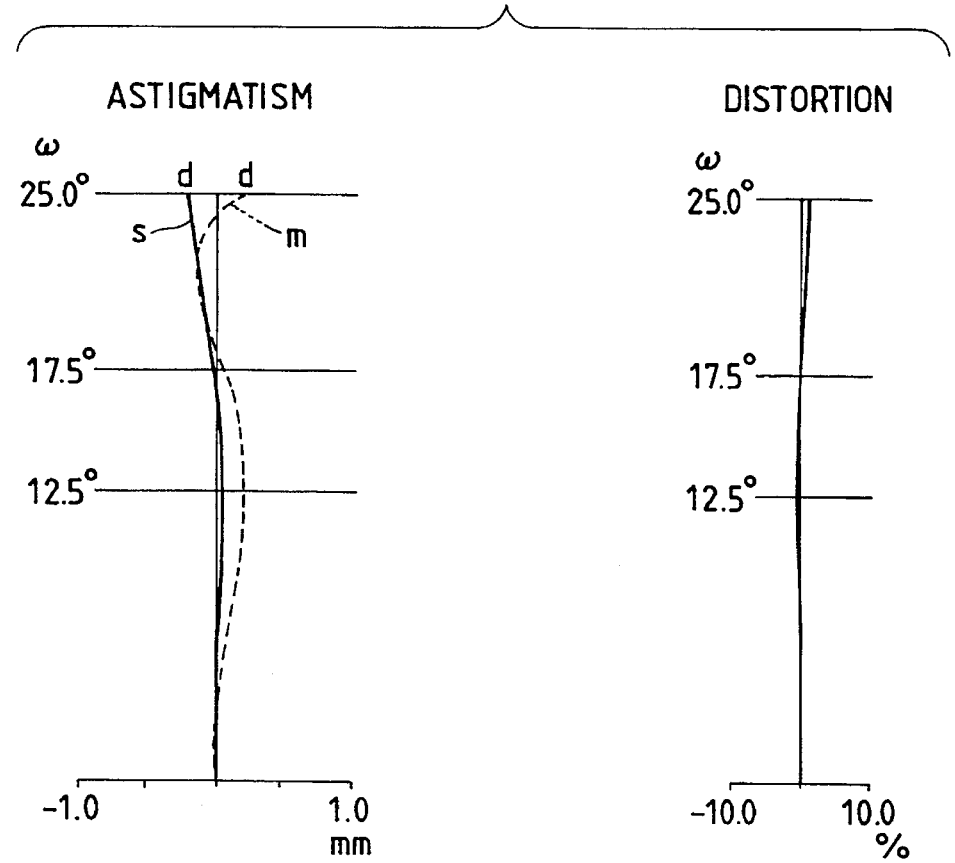
FIG. 2 is a diagram showing various aberrations in the embodiment 1.

FIG. 2 is a diagram showing a variety of aberrations in the embodiment 1, wherein each of the aberrations is the one when tracking a beam of light from the eye-point-side.

In each aberration diagram, $\omega$ represents a half of value of the field of view. Further, in the aberration diagram showing an astigmatism, the solid line indicates the sagittal image surface, and the broken line indicates the meridional image surface.

As is obvious from the respective aberration diagrams, in accordance with this embodiment, the various aberrations are sufficiently corrected through a wide field of view ($2\omega$=50°). Especially, the distortion can be restrained down to almost zero through the wide field of view. In addition, an eye relief having a length that is 131% of the focal length of the whole lens system can be obtained.

Embodiment 2

Figure 3:
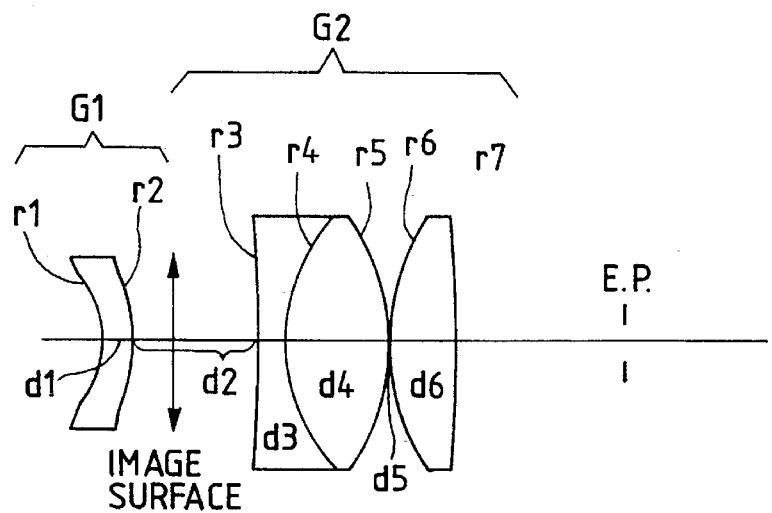
FIG. 3 is a view illustrating a layout of the aspherical surface ocular lens in accordance with a second embodiment of the present invention.

FIG. 3 is a view illustrating a lens layout of the aspherical surface ocular lens in accordance with a second embodiment of the present invention.

The illustrated aspherical surface ocular lens is constructed of, sequentially from the object side, the first lens unit G1 composed of the negative meniscus aspherical lens with its convex surface toward the eye-point-side and the second lens unit G2 composed of the cemented positive lens of the biconcave lens and the biconvex lens and also the biconvex lens.

Note that E.P. designates the eye point in FIG. 3.

Table 2 shows values of data in the embodiment 2. In Table 2, f is the focal length, and $2\omega$ is the field of view. Further, the numeral at the left end represents the order of each lens surface from the object side, r is the radius of curvature of each lens surface, d is the spacing between the respective lens surfaces, and n and v are the refractive index and the Abbe number, respectively with respect to d-line ($\lambda$=587.6 nm).

TABLE 2 f = 10.0
2ω = 50°
Eye relief 12.5

| | r | d | n | ν |
|---|---|---|---|---|
| 1* | −7.944 | 2.0 | 1.4911 | 57.6 |
| 2* | −37.450 | 8.77 | | |
| 3 | −247.500 | 2.0 | 1.7847 | 25.8 |
| 4 | 11.880 | 7.2 | 1.6204 | 60.1 |
| 5 | −14.050 | 0.2 | | |
| 6 | 14.370 | 4.2 | 1.6204 | 60.1 |
| 7 | −112.110 | | | |

(Aspherical Surface Data)

| | k | $C_2$ | $C_4$ |
|---|---|---|---|
| 1st Surface | 1.7580 | 0.0000 | $0.75390 \times 10^{-4}$ |
| | $C_6$ | $C_8$ | $C_{10}$ |
| | $0.10460 \times 10^{-4}$ | $0.14260 \times 10^{-5}$ | $-0.16310 \times 10^{-7}$ |

(Aspherical Surface Data)

| | k | $C_2$ | $C_4$ |
|---|---|---|---|
| 2nd Surface | 0.0000 | 0.0000 | $-0.11850 \times 10^{-2}$ |
| | $C_6$ | $C_8$ | $C_{10}$ |
| | $0.19260 \times 10^{-4}$ | $-0.49560 \times 10^{-8}$ | $0.89350 \times 10^{-8}$ |

(Condition Corresponding Values)

f1 = −21.0
f2 = 12.23
D = 8.77
(1) f1/f = −2.1
(2) D/f = 0.877
(3) $|dx_1/dy|/|dx_2/dy| = 4.0632$ (y = 1)
   $|dx_1/dy|/|dx_2/dy| = 2.9829$ (y = 2)
   $|dx_1/dy|/|dx_2/dy| = 2.1931$ (y = 3)
   $|dx_1/dy|/|dx_2/dy| = 1.6671$ (y = 4)

Figure 4:
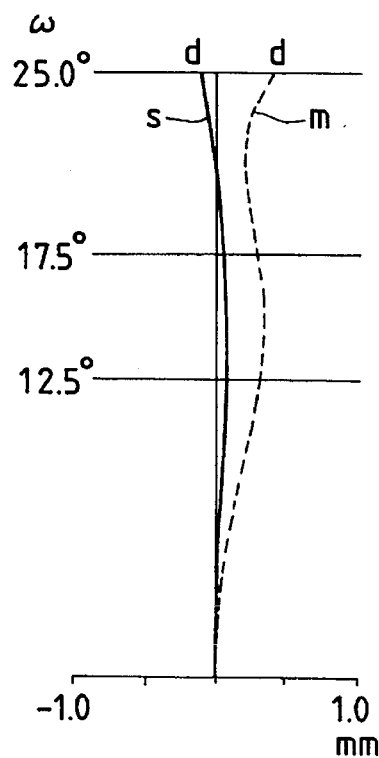
FIG. 4 is a diagram showing various aberrations in the embodiment 2.
Figure 4:
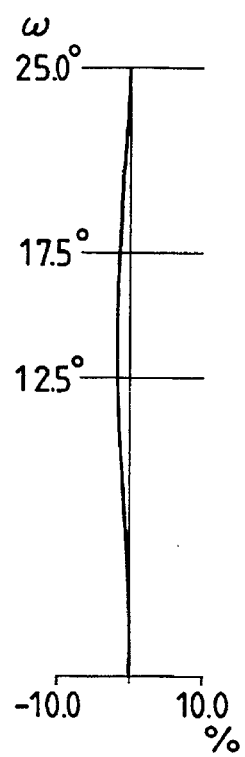

FIG. 4 is a diagram showing a variety of aberrations in the embodiment 2, wherein each of the aberrations is the one when tracking the beam of light from the eye-point-side.

In each aberration diagram, ω represents a half of value of the field of view. Further, in the aberration diagram showing an astigmatism, the solid line indicates the sagittal image surface, and the broken line indicates the meridional image surface.

As is obvious from the respective aberration diagrams, in accordance with this embodiment, the various aberrations are sufficiently corrected through a wide field of view (2ω=50°). Especially, the distortion can be restrained down to almost zero through the wide field of view. In addition, an eye relief having a length that is 125% of the focal length of the whole lens system can be obtained.

Note that the first lens unit G1 involves the use of an optical plastic single lens, and the second lens unit G2 involves the use of, sequentially from the object side, the cemented positive lens of the single lens exhibiting the negative refracting power and the single lens exhibiting the positive refracting power and also the single lens exhibiting the positive refracting power in the consideration of the costs in each of the embodiments discussed above.

However, the above-discussed embodiments present examples of the layout wherein the number of the constructive lens elements as a whole is made as small as possible, but the number of the lens elements of each lens unit may be increased. For instance, the various aberrations can be also corrected better than before by employing an optical glass for the first lens unit G1 or causing the first lens unit G1 to be composed of the cemented lens or increasing the number of the lens elements of the second lens unit G2. The present invention is not confined to the lens layouts in the embodiments.

Further, the configuration of the aspherical surface is not limited to the shape expressed by the above formula (a).

Therefore, it is intended that the invention not be limited to the preferred embodiments described herein, but that the invention will include all embodiments falling within the scope of the appended claims.

What is claimed is:

1. An ocular lens comprising, sequentially from an object side:

a first lens unit exhibiting a negative refracting power on the whole; and a second lens unit exhibiting a positive refracting power on the whole, wherein an object-side focal plane of said second lens unit is positioned between said first lens unit and said second lens unit, at least one lens-surface of said first lens unit is formed in an aspherical shape, and a closest-to-object surface of said first lens unit is a concave surface and a closest-to-eye-point surface of said first lens unit is a convex surface.

2. An ocular lens according to claim 1, wherein said ocular lens satisfies the following conditions:

$$-60 < f1/f < -1.12$$

$$0.45 < D/f < 1.7$$

where f1 is the focal length of said first lens unit, f is the focal length of the whole lens system, and D is the on-axis air spacing between said first lens unit and said second lens unit.

3. An ocular lens according to claim 1, wherein both of the closest-to-object surface and the closest-to-eye-point surface of said first lens unit are formed in an aspherical shape, and said ocular lens, in a range of 0<y<f/2.5, satisfies the following condition:

$$1 < |dx_1/dy|/|dx_2/dy|$$

where f is the focal length of the whole lens system, $x_1$ is the quantity of displacement in an optical-axis direction with a vertex serving as an origin with respect to the aspherical surface closest to an object, $x_2$ is the quantity of displacement in the optical-axis direction with a vertex serving as an origin with respect to the aspherical surface closest to an eye point, and y is the distance from the optical axis on each aspherical surface.

4. An ocular lens according to claim 3, wherein said first lens unit is composed of a single lens element.

* * * * *